L. ERVING.
Oven for Gas Cook Stoves.
No. 58,398. Patented Oct. 2, 1866.
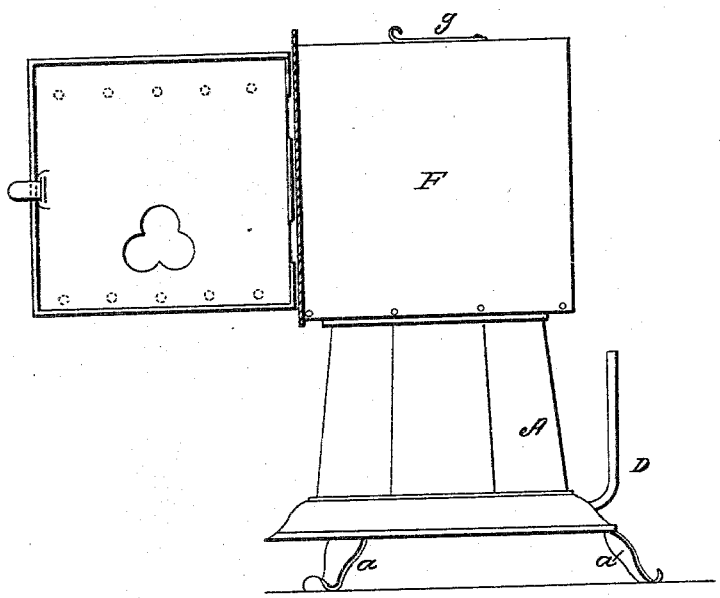
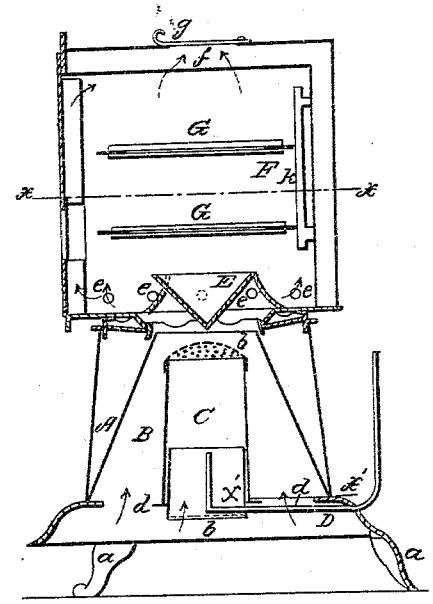
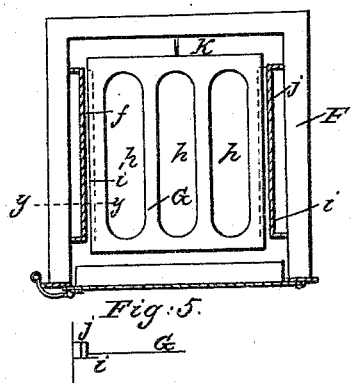
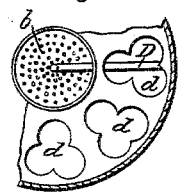
Witnesses:
Inventor:
Luther Erving.

UNITED STATES PATENT OFFICE.

LUTHER ERVING, OF BROOKLYN, NEW YORK.

OVEN FOR GAS COOK-STOVE.

Specification forming part of Letters Patent No. 58,398, dated October 2, 1866; antedated September 23, 1866.

*To all whom it may concern:*

Be it known that I, LUTHER ERVING, of Brooklyn, in the county of Kings and State of New York, have invented a new and Improved Gas Cook-Stove; and I do hereby declare that the following is a full, clear, and exact description thereof, which will enable those skilled in the art to make and use the same, reference being had to the accompanying drawings, forming part of this specification, in which—

Figure 1 is a side elevation of my invention; Fig. 2, a vertical central section of the same; Fig. 3, a horizontal section of the oven pertaining to the same, taken in the line $x\,x$, Fig. 2; Fig. 4, a detached horizontal section of the burner and a portion of the base-plate of the stove, taken in the line $x'\,x'$, Fig. 2; Fig. 5, a horizontal section of a portion of the oven, taken in the line $y\,y$, Fig. 3.

Similar letters of reference indicate corresponding parts.

This invention relates to a new and improved gas cook-stove; and it consists in a novel application of an oven to the stove and in the manner of heating the same, as well as an improvement in the arrangement of the shelves of the oven, and in the gas-burning arrangement, as hereinafter fully shown and described, whereby the oven may be heated with a very moderate consumption of gas, and evenly heated throughout, so that the baking will be performed in a perfect manner.

A represents the base of the stove, which may be of polygonal or other suitable form, provided with feet $a$. Within this base A there is placed a frustum of a hollow cone, B, which extends the whole height of the base, and has an upright cylinder, C, within it, said cylinder having its upper and lower ends covered with wire-cloth or perforated plates $b$.

D is the gas-pipe, which passes into the lower part of C, as shown clearly in Fig. 2. The cylinder C is a gas-chamber, and it extends upward nearly to the top of the cone B, air being admitted through perforations $d$ at the bottom of the cone, as indicated by the red arrows in Fig. 2.

E is an inverted cone, which is placed in the lower part of the oven F, and is directly over the cylinder C, as shown in Fig. 2.

The oven F is constructed with double walls at its sides and top. It is essential that the top have double walls, and also two opposite sides. The back and door may have double walls or not, as desired.

The inner walls of the oven are perforated at their lower ends, as shown at $e$, and the outer or top wall of the oven has a vent or opening, $f$, in it, which may be provided with a cover, $g$, in order to admit of it being contracted or varied in capacity, as may be desired.

The exterior of the oven—the outer wall—I design to have of bright metal-tinned plate, in order to avoid the radiation of heat from the oven. The inner walls I design to have black, in order that heat may be radiated within the oven.

G represents the oven shelves. Two of them are shown; but any proper number may be used. These shelves have oblong slots or openings $h$ in them, and they rest upon horizontal flanges $i$ at the sides of the oven, said flanges projecting from strips $j$, which are attached at their ends to the oven, a space being allowed between the inner walls and the strips $j$, as shown in Figs. 3 and 5. An upright plate, $k$, is attached to the back oven, against which the shelves G bear.

By this arrangement it will be seen that a space is allowed all around the shelves within the oven, to admit of the heat ascending.

The operation is as follows: When the gas is admitted into C it is ignited at the top of the same, and burns directly over the upper perforated plate, $b$, the flame being supplied with oxygen through the cone B, which brings the air in direct contact with the flame, insuring perfect combustion, air also entering into the lower part of C and mingling with the gas. The heat ascends directly upward into the oven F, while the draft is deflected by the inverted cone E into the perforations $e$, as shown by the red arrows in Fig. 2, and passes up between the inner and outer walls of the oven, and escapes through the vent $f$.

Thus it will be seen that the oven has the benefit of direct radiation of heat from the flame, as the heat ascends directly upward within the oven, and also has the benefit of the heat radiated from the inner walls, which serve as flues to lead off the products of combustion from the flame.

The device may be constructed at a moderate cost, and the oven may be heated in a short time, and articles baked with but a very moderate consumption of gas.

I claim as new and desire to secure by Letters Patent—

1. The inverted conical deflector E, when used in connection with an oven, F, and a gas-burner, substantially as and for the purpose set forth.

2. Constructing the oven with double walls to form flues or draft-passages, when said oven is provided with a deflector, E, arranged relatively with the draft-passages so as to guide or deflect the products of combustion into the flues, and at the same time admit of the heat from the flame rising directly into the oven, as set forth.

3. The shelves G in the oven F, arranged in such a manner that they have open spaces on every side to allow the heat to pass, in the manner and for the purposes described.

LUTHER ERVING.

Witnesses:
M. M. LIVINGSTON,
C. L. TOPLIFF.